(12) United States Patent
Ottenheijm

(10) Patent No.: US 7,358,285 B2
(45) Date of Patent: Apr. 15, 2008

(54) FLAME RETARDANT POLYAMIDE COMPOUND

(75) Inventor: Johannes H. G. Ottenheijm, Born (NL)

(73) Assignee: DSM IP Assets B.V., TE Heerlen (NL)

( * ) Notice: Subject to any disclaimer, the term of this patent is extended or adjusted under 35 U.S.C. 154(b) by 169 days.

(21) Appl. No.: 10/538,637

(22) PCT Filed: Dec. 10, 2003

(86) PCT No.: PCT/NL03/00874

§ 371 (c)(1),
(2), (4) Date: Aug. 2, 2005

(87) PCT Pub. No.: WO2004/056916

PCT Pub. Date: Jul. 8, 2004

(65) Prior Publication Data

US 2006/0014866 A1    Jan. 19, 2006

(30) Foreign Application Priority Data

Dec. 19, 2002 (EP) .................................. 02080410

(51) Int. Cl.
*C08K 5/3492* (2006.01)
(52) U.S. Cl. ........................ 524/100; 124/99; 124/127; 124/140; 124/141

(58) Field of Classification Search .......... 524/99–100, 524/127, 140–141
See application file for complete search history.

(56) References Cited

U.S. PATENT DOCUMENTS

| 5,541,267 | A | | 7/1996 | Akkapeddi et al. | |
|---|---|---|---|---|---|
| 5,618,865 | A | * | 4/1997 | Martens et al. | 524/100 |
| 6,025,419 | A | * | 2/2000 | Kasowski et al. | 524/100 |
| 6,166,114 | A | * | 12/2000 | Cosstick et al. | 524/100 |
| 6,548,591 | B2 | * | 4/2003 | Koning et al. | 524/494 |

FOREIGN PATENT DOCUMENTS

| EP | 0 416 430 | 3/1991 |
|---|---|---|
| EP | 0 498 977 | 8/1992 |
| WO | WO 00/75233 | 12/2000 |

* cited by examiner

*Primary Examiner*—Peter Szekely
(74) *Attorney, Agent, or Firm*—Nixon & Vanderhye P.C.

(57) ABSTRACT

The present invention relates to a flame retardant polyamide compound comprising a polyamide polymer having a weight-average molecular weight of at least 10,000 g/mol, a polyamide oligomer having a weight-average molecular weight of at most 7500 and a halogen-free phosphorous containing flame retardant. The invention also relates to a process for preparing said flame retardant polyamide compound and to the use of said compound.

30 Claims, No Drawings

FLAME RETARDANT POLYAMIDE COMPOUND

This application is the US national phase of international application PCT/NL2003/000874 filed 10 Dec. 2003 which designated the U.S. and claims benefit of EP 02080410.0, dated 19 Dec. 2002, the entire content of which is hereby incorporated by reference.

The present invention relates to a flame retardant polyamide compound comprising a polyamide polymer having a weight-average molecular weight of at least 10,000 g/mol, a halogen-free flame retardant and a polyamide oligomer having a weight-average molecular weight of at most 7500, and to a process for preparing said flame retardant polyamide compound.

Such a compound is known from JP-5214246-A (Toray, 1992). JP-5214246-A describes a polyamide compound wherein the polyamide oligomer has a molecular weight of 5000 or less and is modified with hydrocarbon radicals with 5-30 carbon atoms as terminals groups, more particular the hydrocarbon radicals are attached to at least 40% or more of the terminals of the polyamide oligomer. The halogen-free flame retardant is a triazine flame retardant, in particular melamine cyanuric acid. In the process according to JP-5214246-A, the polyamide oligomer modified with said hydrocarbon radicals and the triazine flame retardant are melt-mixed with a polyamide polymer, more particular polyamide-6 and polyamide-6,6, in an amount of 0.001-10 parts by weight of the polyamide oligomer and 1-25 parts by weight of the flame retardant, relative to 100 parts by weight of the polyamide resin. The thus obtained polyamide compound is claimed to have good flame resistance, flowablility, mould separability and mechanical properties.

In many applications requiring a high flame retardancy level, an amount of 25 parts by weight of a halogen-free flame retardant, relative to polyamide polymer, is insufficient to comply with the required flame retardancy level. A disadvantage of the compounds according to JP-5214246-A is that the amount of flame retardant has to be limited to 25 parts by weight, because when said amount exceeds this limit, according to JP-5214246-A, gas is produced at the time of moulding of the compound obtained by the process, and the outer appearance of the moulded product is damaged.

The object of the invention is to provide a polyamide compound comprising a halogen-free flame retardant and an polyamide oligomer, from which compound moulded products, showing a good outer appearance and having good mechanical properties can be prepared, even when the compound comprises the flame retardant in a amount larger than per the prior art.

This object is achieved by the compound wherein the halogen-free flame retardant is a halogen-free phosphorous containing flame retardant. The compound according to the invention allows the preparation of a moulded product having a good outer appearance and having mechanical properties which are at least as good as the mechanical properties of a compound prepared from a corresponding compound without polyamide oligomer. Moreover, the good outer appearance and retention of mechanical properties can not only be achieved with a content of flame retardant above 25 parts by weight, more particular above 30 parts by weight, relative to the 100 parts by weight of the polyamide polymer, but even with a polyamide oligomer content above 10 parts by weight, more particular above 12 parts by weight, relative to the 100 parts by weight of the polyamide polymer.

In the context of the present invention, a polyamide compound is understood to be a polyamide composition that is obtainable by melt-mixing of the constituting components of the polyamide composition and is suitable for being used in a moulding process for preparing a shaped article. The polyamide compound may have different forms, for example, but not limited thereto, a melt (for example in an apparatus suitable for preparing moulded parts), extruded strands, chopped granules, and molded parts (for example when the polyamide composition after being melt-mixed is directly shaped into a moulded part).

In the context of the present invention a polyamide polymer is understood to be a high-molecular polyamide with a weight-average molecular weight of at least 10,000 g/mol, preferably at least 15,000 g/mol, more preferably at least 20,000 g/mol.

The polyamide oligomer is herein understood to be a low-molecular polyamide with a weight-average molecular weight of at most 7500 g/mol. Preferably, the weight-average molecular weight is lower than the "molecular weight between entanglements" of the high-molecular polymer. This "molecular weight between entanglements" is for example 5,000 g/mol in the case of PA-6. Also preferably the weight average molecular weight of the polyamide oligomer is at most 5,000 g/mol, more preferably at most 4,000 g/mol, even more preferably at most 3,000 g/mol. The molecular weight of the polyamide oligomer may not be too low either, to avoid the risk of for example the glass transition temperature being lowered. Preferably the weight-average molecular weight is greater than approximately 1,000 g/mol.

Suitable polyamides, for both the polyamide polymer and the polyamide oligomer, are all the polyamides known to a person skilled in the art, comprising crystalline, semi-crystalline and amorphous polyamides that are melt-processable. Examples of suitable polyamides according to the invention are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, aromatic polyamides, for example PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMDT-copolyamide (2-MPMDT=2-methylpentamethylene diamine), PA-9,T, copolyamides obtained from terephthalic acid, 2,2,4-and 2,4,4-trimethyl-hexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and also copolyamides and mixtures of the aforementioned polyamides.

Preferably polyamides are chosen from the group comprising PA-6, PA-6,6, PA-6,10, PA-4,6, PA-11, PA-12, PA-12,12, PA-6,I, PA-6,T, PA-6,T/6,6-copolyamide, PA-6, T/6-copolyamide, PA-6/6,6-copolyamide, PA-6,6/6,T/6,I-copolyamide, PA-6,T/2-MPMDT-copolyamide, PA-9,T, PA-4,6/6-copolyamide and mixtures and copolyamides of the aforementioned polyamides. More preferably PA-6,I, PA-6,T, PA-6,6, PA-6,6/6T, PA-6,6/6,T/6,I-copolyamide, PA-6,T/2-MPMDT-copolyamide, PA-9,T or PA-4,6, or a mixture or copolyamide thereof, is chosen as the polyamide.

The low molecular weight polyamide oligomer may be chosen to have the same composition as the high molecular weight polyamide; the two polyamides, i.e. the oligomer and the polymer, may also be chosen to have different compositions.

The high molecular weight polyamide polymer in the compound according to the invention may optionally contain modified end groups, for example amine end groups modified with a mono-carboxylic acid and/or carboxylic acid end groups modified with a mono-functional amine. Modified end-groups in the high molecular weight polyamide polymer may advantageously be applied for improved melt-stability of the compound during its preparation by melt-mixing or during a moulding process of said compound.

The polyamide oligomer preferably has a melting temperature of at least 260° C., more preferable at least 270° C., even more preferable at least 280° C. The advantage of a polyamide oligomer with a higher melting temperature, in particular when used in a larger amount, is that the high temperature mechanical properties of the polyamide compound are better retained or even improved.

A polyamide that is eminently suited for the polyamide oligomer in the process according to the invention is polyamide-4,6. Polyamide-4,6 oligomer has a melting temperature of about 290° C. The advantage of polyamide-4,6 oligomer is that it can be produced on industrial scale and that it can be combined with a wide range of high temperature engineering polyamides.

In the context of this application "PA-4,6" is understood to be a polyamide of which at least 50%, preferably at least 75%, more preferably at least 90%, consists of tetramethyleneadipamide units. PA-4,6 can be prepared through polycondensation of tetramethylenediamine and adipic acid or an adduct thereof, optionally in the presence of other polyamide-forming monomers, for example ε-caprolactam, a different diamine, for example hexamethylenediamine or a different carboxylic acid, for example isophthalic acid or cyclohexanedicarboxylic acid.

The polyamide oligomer in the compound according to the invention may optionally contain modified end groups, for example amine end groups modified with a mono-functional carboxylic acid and/or carboxylic acid end groups modified with a mono-functional amine. Mono-functional carboxylic acids and/or mono-functional amines may advantageously be applied during the preparation of the polyamide oligomer as a chain stopper to control the molecular weight of the polyamide oligomer. Preferably, the polyamide oligomer comprises at most 50%, more preferably less than 40%, even more preferably at most 30% and most preferably at most 25%, modified end groups relative to the total number of end groups. The advantage of a polyamide oligomer with a lower percentage of modified end groups in the process according to the invention is that the mechanical properties of the resulting compound, when comprising a halogen-free flame retardant, are further improved.

The compound according to the invention typically comprises 0.5-30 weight % oligomer, relative to the total amount of polyamide. A person skilled in the art can choose the amount of oligomer within the given range, depending on the desired properties of the compound. Larger amounts of the oligomer can be used and may even result in a better performance of the flame retardant. However, too large amounts may adversely affect the mechanical properties. Preferably an amount of 1-20 weight % oligomer, relative to the total amount of polyamide, is chosen.

More preferably, the amount of polyamide oligomer is at most 15 weight %, even more preferably at most 11 weight %, relative to the total amount of polyamide, since a lower amount results in better mechanical properties.

Also more preferably, the amount of polyamide oligomer is at least 2 weight %, even more preferably at least 7 weight %, or even better 12 weight %, and most preferably at least 15 weight %, relative to the total amount of polyamide, since an higher amount results in a better flow.

A higher amount of polyamide oligomer is even more advantageously applied in combination with a higher amount of the halogen free phosphorous containing flame retardant. A higher content of flame retardant generally reduces the flowability of a polyamide compound. The compounds comprising these said two components in the higher amounts combine the advantageous properties of good flow and increased flame retardancy with retention of the good mechanical properties and outer appearance.

Suitable halogen-free phosphorus containing flame retardants that can be used in the compound according to the invention, are phosphorus-containing compounds including red phosphorus, phosphazene-based compounds, organic phosphorus compounds, and nitrogen-and-phosphorus containing compounds (such as ammonium polyphosphate and melamine based phosphorous compounds).

Suitable organic phosphorus compounds are, for example, organic phosphates, phosphites, phosphonates, phosphinates and phosphine oxides. Examples of such phosphorus compounds are described in for example the "Encyclopedia of Chemical Technology", Vol. 10, p. 396 ff. (1980). Many are commercially available, for example resorcinol-bis(diphenylphosphate) oligomer, under the trade name Fyrolflex® RDP from AKZO-Nobel, NL; cresyl-diphenylphosphate (CDP) under the trade name Kronitex® CDP from FMC, UK; trimethylolpropanol ester of methyl phosphoric acid, under the trade name Amgard P45 from Albright and Wilson, USA; trimethylolpropanol ester of methylphosphonic acid, under the trade name Antiblaze® 1045 from Albright & Wilson, USA; polypenta-erythritol erythritol phosphonate under the trade name Cyagard® RF 1041 from American Cyanamid, USA; Hostaflam® OP 910, a mixture of cyclic di- and triphosphonates from Clariant, Germany.

Suitable melamine based phosphorus compounds that can be used as the flame retardant in the inventive polyamide compounds are, for example, melamine phosphates, like melamine phosphate, melamine pyrophosphate and melamine polyphosphate, for example Melapur® 200 (DSM, the Netherlands) and PMP-100 ® (Nissan Chemical Industries, Japan), and phosphates of melamine condensation products, like melam polyphosphate, for example PMP-200® (Nissan Chemical Industries), and melem polyphosphate, for example PMP-300® (Nissan Chemical Industries).

In a preferred embodiment of the invention the flame retardant is a melamine based phosphorous compound. An advantage is that the inventive polyamide compound may comprise a higher melting polyamide while still retaining a good outer appearance and good mechanical properties together with retention of the flame retardant properties.

More preferable, the melamine based phosphorous is a melamine based polyphosphate. The advantage is an even better thermal stability allowing processing at higher temperature and use of a polyamide with a higher melting temperature.

Also preferably, as the flame retardant a phosphorus compound with a low volatility is chosen. It is also advantageous to use an organic phosphorus compound with a phosphorus content of at least 14 weight %, preferably at least 18 weight %. Examples of such organic phosphorus compounds with a phosphorus content of at least 14 weight % are Amgard-P45 and the metal phosphinates as for instance in U.S. Pat. No. 4,208,321 and U.S. Pat. No. 3,594,347. The advantage of the use of an organic phosphorus compound with a higher phosphorus content is that compounds with better mechanical properties can be obtained, while maintaining good flame retardancy performance.

In the flame-retardant polyamide compounds according to the invention the flame retardant is typically present in an amount between 1 and 100 parts by weight, relative to a total amount of polyamide of 100 parts by weight. Higher amounts may be used as well. Preferably, the amount is at least 15 parts by weight, more preferably at least 20 parts by weight, even more preferably at least 27 parts by weight and most preferably at least 40 parts by weight, relative to the total amount of polyamide of 100 parts by weight. A higher minimum amount of flame retardant is advantageously applied in compounds having a higher flame retardancy performance.

Also preferably, the amount of flame retardant is at most 90 parts by weight, more preferably at most 85 parts by weight and most preferably at most 80 parts by weight, relative to the total amount of polyamide of 100 parts by weight. A lower minimum amount of flame retardant is advantageously applied in compounds having an increased toughness and impact resistance and/or flowability. The optimal amount can in principle be determined experimentally by a person skilled in the art of formulating polyamide compounds through systematic research.

In the compound according to the invention, next to the flame retardant also additives contributing to the flame retardancy behaviour may be present.

Suitable additives for this purpose are flame retardant synergists, charring agents, dripping modifiers and anti-dripping components.

Suitable synergists are, for example Group IIA and IIB metal borates, [like zinc borate, for example Firebrake® ZB (Borax Inc., USA)] and metal oxides and hydroxides [such as magnesium hydroxide, aluminum hydroxide, iron oxide, zinc oxide, calcium oxide and analogous substances].

Suitable carbon-forming substances are, for example, polyphenylene ether and polycarbonate.

Suitable additives that can modifiy the dripping behaviour are, for example, fluoropolymers such as polytetrafluoroethylene.

Suitable anti-drip components are, for example, polymers prepared from monomers comprising at least an ethylenically unsaturated monomer and at least a carboxylic acid containing monomer. Preferably, the monomers comprise ethylene as the ethylenically unsaturated monomer.

The compound according to the invention may also contain other additives known to a person skilled in the art that are customarily used in polymer compounds, provided that they do not essentially detract from the invention. Such other additives include, in particular, fillers, pigments, processing aids, for example mould release agents, agents accelerating crystallization, nucleating agents, lubricants, softeners, UV and heat stabilizers and the like. In particular, the compound according to the invention contains an inorganic filler or reinforcing agent. Suitable for use as an inorganic filler or reinforcing agent are all the fillers known to a person skilled in the art. Suitable reinforcing agents are, for example glass fibres, metal fibres, graphite fibres, aramide fibres, glass beads, aluminum silicates, asbestos, mica, clay, calcined clay and talcum.

Typically, the polyamide compound according to the invention consists of:
a) 70-99.9 parts by weight of a polyamide polymer having a weight-average molecular weight of at least 10,000 g/mol
b) 0.1-30 parts by weight of a polyamide oligomer having a molecular weight of at most 7500 g/mol, whereby the total amount of a) +b) is 100 parts by weight
c) 1-100 parts by weight of a halogen-free phosphorous containing flame retardant
d) 0-100 parts by weight of a reinforcing agent
e) 0-25 parts by weight of at least one other component.

The invention also relates to a process for preparing a flame retardant polyamide compound according to the invention by melt-mixing of a composition comprising a polyamide polymer having a weight average molecular weight of at least 10,000 g/mol, a polyamide oligomer with a molecular weight below 7500 g/mol and a halogen-free phosphorous containing flame retardant. With the process according to the invention a polyamide compound with lower total burning times in flame retardancy tests can be prepared than with the corresponding process comprising melt-mixing of a polyamide composition not comprising a polyamide oligomer. The compound resulting from the inventive process also shows, as an additional advantage, at least retained mechanical properties, whereas moulded products prepared from said inventive compounds exhibit a good outer appearance, even with a polyamide oligomer content above 10 parts by weight, and/or with a content of flame retardant above 25 parts by weight, relative to 100 parts by weight of the polyamide polymer.

Preferred embodiments of the inventive process directly relate to the preferred embodiments of the polyamide compounds according to the invention described above.

The process according to the invention can be carried out in a melt-mixing apparatus, for which any melt-mixing apparatus known to the man skilled in the art of preparing polymer compounds by melt-mixing can be used. Suitable melt-mixing apparatus are, for example, kneaders, Banburry mixers, single screw extruders and double screw extruders. Melt-mixing is typically performed at a processing temperature, which is above the melting temperature of the high molecular weight polyamide, thereby forming a polymer melt.

In the process according to the invention for preparing a polyamide compound, comprising a polyamide polymer, a polyamide oligomer and a halogen-free phosphorous containing flame retardant as constituting components amongst possible other constituting components, the constituting components are fed to a melt-mixing apparatus and melt-mixed in that apparatus. The constituting components, i.e. polymer and oligomer, may be fed simultaneously as a powder mixture or granule mixer, also known-as dry-blend, or may be fed separately. Polyamide polymer and polyamide oligomer may also be fed separately.

In a preferred emodiment of the inventive process, the halogen-free phosphorous containing flame retardant is a melamine based phosphorous compound. The advantage is that the melt-mixing may be performed at higher temperature and a higher melting polyamide may be used with retention of a good flame retardancy performance.

In another preferred embodiment, the polyamide polymer is a high temperature engineering polyamide, defined by a melting temperature of at least 260° C. More preferable, the melting temperature is at least 270° C., even more preferable at least 280° C., and most preferably at least 290° C. The higher the melting temperature of the polyamide polymer, the more pronounced the effect of addition of the polyamide oligomer in the melt-mixing process on retention and/or improvement in mechanical properties, and/or flame retardancy and/or surface appearance of the compound formed, is.

Also preferably, the polyamide oligomer has a melting temperature of at most 20° C. above, more preferable at most 10° C. above to the melting temperature of the polyamide polymer, and even more preferable at most equal to the melting temperature of the polyamide polymer. The advantage of a polyamide oligomer with a melting temperature that does not exceed the melting temperature of the polyamide polymer too much or even better with a melting temperature that does not exceed the melting temperature of the polyamide polymer at all, is that the processing temperature necessary for the melt-mixing process can be kept as low as or can even be reduced compared to the process without polyamide oligomer and further reduces the effects of degradation of the flame retardant.

The process according to the invention is in particular advantageously applied for preparing a flame retardant polyamide compound comprising a reinforcing agent. Preparation of a flame retardant polyamide compound comprising a reinforcing agent generally suffers even more from deterioration of the flame retardant, or the negative effects thereof upon the properties of the polyamide compound, than non reinforced compounds. With the process according to the invention flame retardant reinforced polyamide compounds can be prepared that show a substantially reduced negative effect of the flame retardant on the mechanical properties of the compound.

Preferably, glass fibres are chosen as the reinforcing agent. With the process according to the invention, also compounds with higher glass content, without a noticeable effect on the flame retardant and without significant decline in flame retardant properties, can be prepared.

The invention also relates to the use of a flame retardant polyamide compound according to the invention for preparing a molded part. The advantage is that processing of the compound can be done at lower processing temperatures and/or lower pressure than corresponding compounds without a polyamide oligomer. Furthermore, the parts have a better flame retardancy and improved mechanical properties.

The invention furthermore relates to a molded part obtainable by melt-processing of a polyamide compound according to any of claims 1-6.

Suitable melt-processes are, for example, injection moulding, blow-moulding and pultrusion. The molded part may be, for example, a part for automotive use, or electrical or electronic use. Examples of such parts include, for example, connectors and switches.

The invention will now be elucidated with reference to the following examples, but is not limited thereto.

| Materials | |
|---|---|
| PP-A | Polyamide polymer: Stanyl ® KS200 (ex DSM, The Netherlands): Polyamide-4,6 polymer, Mw = 36000, viscosity number (formic acid) = 160; $T_{melt}$ = 295° C. |
| PO-A | Polyamide oligomer: (ex DSM, The Netherlands): $M_w$ = 2,000, $T_{melt}$ = 288° C. |
| MPP-200 | Melamine polyphosphate: Melapur 200 (ex DSM, The Netherlands): nitrogen content 42-44 weight %; phosphor content 12-14 weight %. |
| PMP-100 | Melamine polyphosphate; (Nissan Chemical Industries Ltd); phosphor content 14.5 weight %. |
| Glass fibres | Standard glass fibres for polyamide compounds; average fiber diameter 10 μm. |

Determination of the physical properties

Viscosity number: determined in formic acid, according to ISO 307

Tensile strength: determined at 23° C. and 5 mm/min, according to ISO 527

Elongation at break: determined at 23° C. and 5 mm/min, according to ISO 527

Notched Izod: determined at 23° C. according to ISO 180/1A

Molecular weight: determined with the aid of standard GPC techniques

Melting point: determined with the aid of DSC (2nd run, 10° C./min.).

Flame retardancy: determined according Underwriters Laboratories test method UL 94, using 0.8 mm test bars, conditioned for 48 hours at 23° C., 50% relative humidity, respectively for 168 hours at 70° C.

Bulk density: determined according ASTM D 1895-96 Test Method A.

Preparation of Polyamide Compounds

EXAMPLE I and COMPARATIVE EXPERIMENT A

Polyamide compounds according Example I, comprising a combination of PP-A and PO-A, and Comparative Experiment A, only comprising PP-A as the polyamide, both comprising 30 weight % of MPP-200, relative to the total weight of the compound (see Table I) were prepared by melt-mixing the constituent components on a Werner & Pfleiderer ZSK-40 twin screw extruder using a 300° C. flat temperature profile. The constituents were fed via a hopper, glass fibers were added via a side feed. Throughput was 60 kg/h and screw speed was 250 rpm. The polymer melt was degassed at the end of the extruder. The melt was extruded into strands, cooled and chopped into granules.

The granules were injection moulded into test bars according to ISO 527/1A multipurpose specimens and UL 94 test bars of 0.8 mm thick. The test bars were used to measure the flame retardant properties and mechanical properties of the compounds, the results of which have been reported in Table I.

TABLE I

Composition and test results of Example I and Comparative Experiment A

| | Comparative Experiment A | Example I |
|---|---|---|
| Components (weight %): | | |
| PP-A | 40 | 34 |
| PO-A | — | 6 |

TABLE I-continued

Composition and test results of Example I and Comparative Experiment A

|  | Comparative Experiment A | Example I |
|---|---|---|
| MPP-200 | 30 | 30 |
| Glass fibre | 30 | 30 |
| Throughput in kg/h | 60 | 60 |
| Strand formation | Very bad | o.k. |
| Notched Izod (kJ/m²) | 8.6 | 9.0 |
| Tensile strength (MPa) | 101 | 110 |
| Elongation at break (%) | 0.8 | 1.0 |
| UL 94 V flammability properties: 0.8 mm, 70° C./168 h | | |
| V0-Classification: | 100% | 100% |
| Total burning time | 23 | 21 |
| 0.8 mm, 23° C./50% RH/48 h | | |
| V0-Classification | 100% | 100% |
| Total burning time | 19 | 10 |

EXAMPLE II and COMPARATIVE EXPERIMENT B

Example II and Comparative Experiment B represent compounds similar to Example I and Comparative Experiment A, except that PMP-100 was used as the flame retardant. The detailed processing conditions, applied for the preparation of the compounds are the same as described for example I and comparative experiment A. Test results obtained from injection-molded parts prepared from respective granulates have been collected in Table II.

TABLE II

Composition and test results of Example II and Comparative Experiment B

|  | Comparative Experiment B | Example II |
|---|---|---|
| Components (weight %): | | |
| PP-A | 40 | 34 |
| PO-A | — | 6 |
| PMP-100 | 30 | 30 |
| Glass fibre | 30 | 30 |
| Throughput (kg/h) | 60 | 60 |
| Strand formation | o.k. | o.k. |
| Tensile strength (MPa) | 109 | 134 |
| Elongation at break (%) | 1.0 | 1.3 |
| UL 94 V flammability properties: 0.8 mm, 70° C./168 h | | |
| V0-classification: | 80% | 100% |
| Total burning time (sec) | 47 | 34 |
| 0.8 mm, 23° C./50% RH, 48 h | | |
| V0-classification | 0% | 60% |
| Total burning time (sec) | 90 | 45 |

The invention claimed is:

1. Flame retardant polyamide compound comprising a polyamide polymer having a weight-average molecular weight of at least 10,000 g/mol, a halogen-free flame retardant and a polyamide oligomer having a weight-average molecular weight of at most 4000 g/mol,
    wherein the polyamide oligomer is a melt-processable semi-crystalline or amorphous polyamide,
    wherein the halogen-free flame retardant is a halogen-free phosphorous containing flame retardant, and
    wherein the polyamide oligomer has a lower melting point than the polyamide polymer.

2. Compound according to claim 1, wherein the polyamide oligomer is a polyamide with a melting temperature of at least 260° C.

3. Compound according to claim 1, wherein the polyamide oligomer is present in an amount of 0.1-30 weight %, relative to the total weight of polyamide.

4. Compound according to claim 1, wherein the halogen-free phosphorous containing flame retardant is a melamine based phosphorous compound.

5. Compound according to claim 1, wherein phosphorous containing flame retardant is present in an amount between 1 and 100 parts by weight, relative to a total amount of polyamide of 100 parts by weight.

6. Process for preparing a compound according to claim 1 comprising melt-mixing of a polyamide composition comprising a polyamide polymer having a weight-average molecular weight of at least 10,000 g/mol, a polyamide oligomer having a weight-average molecular weight of at most 4000 g/mol, and a halogen-free phosphorous containing flame retardant.

7. Process according to claim 6, wherein the polyamide polymer is a polyamide with a melting temperature of at least 260° C.

8. Process according to claim 1, wherein the polyamide compound comprises a reinforcing component.

9. Molded part obtainable by melt-processing of a polyamide compound according to claim 1.

10. Method of using a polyamide compound according to claim 1 comprising:
    selecting the polyamide compound, and
    preparing a molded part by melt-processing the polyamide compound.

11. Flame retardant polyamide compound comprising a polyamide polymer having a weight-average molecular weight of at least 10,000 g/mol, a halogen-free flame retardant, and a polyamide oligomer having a weight-average molecular weight of at most 7500 g/mol,
    wherein the halogen-free flame retardant is a halogen-free phosphorous containing flame retardant,
    wherein the content of flame retardant is above 25 parts by weight and the content of oligomer is above 10 parts by weight, relative to 100 parts by weight of polyamide, and
    wherein the polyamide oligomer has a lower melting point than the polyamide polymer.

12. Compound according to claim 11, wherein the polyamide oligomer is a polyamide with a melting temperature of at least 260° C.

13. Compound according to claim 11, wherein the polyamide oligomer is present in an amount of 0.1-30 weight %, relative to the total weight of polyamide.

14. Compound according to claim 11, wherein the halogen-free phosphorous containing flame retardant is a melamine based phosphorous compound.

15. Compound according to claim 11, wherein phosphorous containing flame retardant is present in an amount between 1 and 100 parts by weight, relative to a total amount of polyamide of 100 parts by weight.

16. Process for preparing a compound according to claim 11 comprising melt-mixing of a polyamide composition comprising a polyamide polymer having a weight-average molecular weight of at least 10,000 g/mol, a polyamide oligomer having a weight-average molecular weight of at most 7500 g/mol, and a halogen-free phosphorous containing flame retardant.

17. Process according to claim 16, wherein the polyamide polymer is a polyamide with a melting temperature of at least 260° C.

18. Process according to claim 11, wherein the polyamide compound comprises a reinforcing component.

19. Molded part obtainable by melt-processing of a polyamide compound according to claim 11.

20. Method of using a polyamide compound according to claim 11 comprising:
selecting the polyamide compound, and
preparing a molded part by melt-processing the polyamide compound.

21. Flame retardant polyamide compound consisting of:
a. 70-99.9 parts by weight of a polyamide polymer having a weight-average molecular weight of at least 10,000 g/mol
b. 0.1-30 parts by weight of a polyamide oligomer having a molecular weight of at most 7500 g/mol, whereby the total amount of a) +b) is 100 parts by weight
c. 1-100 parts by weight of a halogen-free phosphorous containing flame retardant
d. 0-100 parts by weight of a reinforcing agent
e. 0-25 parts by weight of at least one other component, and
wherein the polyamide oligomer has a lower melting point than the polyamide polymer.

22. Compound according to claim 21, wherein the polyamide oligomer is a polyamide with a melting temperature of at least 260° C.

23. Compound according to claim 21, wherein the polyamide oligomer is present in an amount of 0.1-30 weight %, relative to the total weight of polyamide.

24. Compound according to claim 21, wherein the halogen-free phosphorous containing flame retardant is a melamine based phosphorous compound.

25. Compound according to claim 21, wherein phosphorous containing flame retardant is present in an amount between 1 and 100 parts by weight, relative to a total amount of polyamide of 100 parts by weight.

26. Process for preparing a compound according to claim 21 comprising melt-mixing of a polyamide composition comprising a polyamide polymer having a weight-average molecular weight of at least 10,000 g/mol, a polyamide oligomer having a weight-average molecular weight of at most 7500 g/mol, and a halogen-free phosphorous containing flame retardant.

27. Process according to claim 26, wherein the polyamide polymer is a polyamide with a melting temperature of at least 260° C.

28. Process according to claim 21, wherein the polyamide compound comprises a reinforcing component.

29. Molded part obtainable by melt-processing of a polyamide compound according to claim 21.

30. Method of using a polyamide compound according to claim 21 comprising:
selecting the polyamide compound, and
preparing a molded part by melt-processing the polyamide compound.

* * * * *